United States Patent Office 2,816,023
Patented Dec. 10, 1957

2,816,023

SEMICONDUCTOR MATERIAL AND METHOD OF PREPARING SAME

Milton Genser and Worth P. Allred, Columbus, Ohio, assignors, by mesne assignments, to Battelle Development Corporation, Columbus, Ohio, a corporation of Delaware No Drawing. Application November 2, 1955, Serial No. 544,585

10 Claims. (Cl. 75—149)

This invention relates to a semiconductor material and to a method of preparing it.

Aluminum antimonide is now known to be a semiconductor material suitable for use in various applications requiring asymmetric conduction, as in rectifiers and transistors. Aluminum antimonide has a band separation of 1.65 electron volts, a melting point of about 1050° C., and a carrier mobility of at least about 100 square centimeters per volt second for p-type and n-type carriers in polycrystalline material. The band separation of aluminum antimonide is much higher than that of either germanium or silicon, and the melting point is lower than that of silicon. Because of these properties, aluminum antimonide is useful at high temperatures, and does not have the fabrication limitations of silicon.

Although satisfactory techniques have been developed for preparing aluminum antimonide of low resistivity, it is extremely difficult to prepare aluminum antimonide of high resistivity. The usual processes for preparing aluminum antimonide comprise continued recrystallization of the molten compound in aluminum oxide crucibles. Thermodynamic calculations show that the compound dissociates at the melting point, and this fact has been verified experimentally. Because of the dissociation, an impurity addition is always present in the compound from the effects of the free elements aluminum and antimony. The best results that have been reported as of the time of the present invention indicate that appreciable quantities of aluminum antimonide having resistivities as high as 200 ohm-centimeters at room temperature had been produced only by extensive zone refining in pure alumina crucibles.

As the purity of aluminum antimonide is increased, its resistivity is also increased. It is virtually impossible, however, to obtain the purities that would be required to provide resistivities much higher than 200 ohm-centimeters, except perhaps on a laboratory scale. It has been known that aluminum antimonide with a resistivity of 10,000 ohm-centimeters or higher at room temperature would have many uses and advantages. In the past many unsuccessful attempts have been made to provide aluminum antimonide of such high resistivity.

It is a primary object of the present invention, therefore, to provide a high resistivity semiconductor material consisting predominantly of aluminum antimonide. It is also an object to provide a method for preparing such a material.

Other objects and advantages of the present invention are apparent from the disclosure herein.

A semiconductor material according to the present invention consists essentially of aluminum antimonide to which tantalum has been added and incorporated into the crystal lattice. It has been found that such a material has a much higher resistivity than has the same aluminum antimonide alone. Aluminum antimonide of a given purity has one value of resistivity. The same aluminum antimonide with tantalum incorporated into the crystal lattice has a much higher resistivity. Preferably, the aluminum in the semiconductor material should have a purity of at least about 99.9995 percent, the antimony should have a purity of at least about 99.998 percent, and the tantalum should have a purity of at least about 99.9 percent. The aluminum and antimony should be present in stoichiometric proportions to obtain the compound aluminum antimonide, and the compound preferably should be saturated with the tantalum. Such a semiconductor material has a resistivity of at least about 10,000 ohm-centimeters. The same material without the tantalum has a resistivity of 200 ohm-centimeters or lower.

The method of preparing the semiconductor according to the present invention comprises reacting aluminum, preferably having a purity of at least about 99.9995 percent, and antimony, preferably having a purity of at least about 99.998 percent, in substantially stoichiometric proportions, and incorporating a trace amount of tantalum, preferably having a purity of at least about 99.9 percent into the crystal lattice of the material. Preferably the amount of tantalum should be sufficient to provide saturation of the tantalum in the semiconductor material.

The tantalum can be incorporated into the crystal lattice by reacting the aluminum and the antimony in a container, such as an aluminum oxide crucible or a graphite crucible of high purity, that is lined with tantalum sheet, preferably having a purity of at least about 99.9 percent. Alternatively, the tantalum can be incorporated into the crystal lattice of the material by reacting the aluminum and the antimony in a tantalum boat or other form of tantalum container the inside surface of which preferably has a purity of a least about 99.9 percent. Whichever form of container is used the essential requirement is that the inside surface of the container be made of tantalum, preferably having a purity of at least about 99.9 percent. Where it is desired to carry out the reaction in a container that does not have an inner surface of tantalum, the tantalum can be incorporated into the crystal lattice by adding to the aluminum and antimony a trace amount of tantalum powder, preferably an amount sufficient to provide saturation of the tantalum in the semiconductor material. The tantalum powder preferably should have a purity of at least about 99.9 percent. Saturation of the tantalum in the semiconductor material is reached with trace quantities of the tantalum.

The materials may be reacted by zone melting in an induction furnace. Several zone passes should be made to obtain an ingot of high resistivity. The high resistivity material is found near the front of the ingot, the first portion to freeze. Alternatively, an ingot of high resistivity can be produced by drawing from the melt, a conventional technique commonly used in germanium crystal growth and known as the Czochralski technique. The important feature of each technique is the directional cooling of the melt.

The method of the present invention consistently provides a semiconductor material having a resistivity of at least 10,000 ohm-centimeters. Specimens having resistivities as high as 1,000,000 ohm-centimeters have been produced by this method. The resistivity of the semiconductor material depends largely upon its purity, with higher purity providing higher resistivity. Whatever the purity of the aluminum and of the antimony, however, and of the aluminum antimonide prepared therefrom, the incorporation of tantalum into the crystal lattice increases its resistivity by at least about two orders of magnitude.

The high resistivity semiconductor material of the present invention is useful in many types of device in which aluminum antimonide of low resistivity is not suitable. The following examples are illustrative of such uses but are not intended to be inclusive.

The semiconductor of the present invention is useful in thermistors. It has intrinsic conductivity below 100° C. Since aluminum antimonide has an energy gap of 1.65 electron volts, and since the conductivity as a function of temperature is $\sigma = \sigma_0$ exp. 165 $ev/2kT$, aluminum antimonide with tantalum in the crystal lattice has a large temperature coefficient of resistivity and can be employed as the temperature sensitive element in a thermistor.

The mtaerial is useful also as a photoconductor. It has a charge carrier concentration in the order of $10^{12}$ to $10^{13}$ carriers per cubic centimeter. The energy density in a watt of radiation of about 1 electron volt photons is about $10^{19}$ photons per cubic centimeter. Thus, appreciable changes in conductivity are effected in the material when irradiated with radiation in the near infrared band. Since normal daylight and electric lights contain large amounts of radiation in this wave length band, the material can be used as a photoconducting element in a photo sensitive device. It has been observed in the laboratory that a 50 percent change in resistance is obtained in a small specimen of the material when it is irradiated with an ordinary flashlight.

The semiconductor material can be used in infrared detectors for the band of 0.8 to 4 microns. The infrared transmission spectrum shows a 4 micron absorption band at liquid nitrogen temperature, approximately 80° K.

The high-resistivity material has a very high Hall coefficient. This makes it useful for various applications utilizing the Hall effect principle. One such use is in a multiplying circuit for computer applications where the Hall voltage $V_H$ provides a measure of the product of the magnetic field multiplied by the current through the material.

The forms of the invention disclosed herein constitute preferred embodiments, but it is not intended to set forth all of the possible equivalent forms or ramifications of the invention. It is to be understood that the words used herein are words of description rather than of limitation and that various changes may be made without departing from the spirit or scope of the present invention.

What is claimed is:

1. A semiconductor material consisting essentially of aluminum antimonide to which a trace amount of tantalum has been added and incorporated into the crystal lattice, characterized by a resistivity of at least about 10,000 ohm-centimeters.

2. A semiconductor material consisting essentially of alumnium antimonide made of aluminum having a purity of at least about 99.9995 percent and antimony having a purity of at least about 99.998 percent, and a trace amount of tantalum incorporated into the crystal lattice, characterized by a resistivity of at least about 10,000 ohm-centimeters.

3. A method of preparing a semiconductor material that comprises reacting aluminum and antimony in substantially equal atomic proportions, and incorporating into the crystal lattice of the material a trace amount of tantalum sufficient to provide a resistivity in said material of at least about 10,000 ohm-centimeters.

4. A method of preparing a semiconductor material that comprises reacting aluminum having a purity of at least about 99.9995 percent and anitmony having a purity of at least about 99.998 percent in substantially equal atomic proportions, incorporating into the crystal lattice of the material an amount of tantalum having a purity of at least about 99.9 percent sufficient to provide a resistivity in said semiconductor material of at least about 10,000 ohm-centimeters, and directionally cooling the melt of said material.

5. A method of preparing a semiconductor material that comprises reacting aluminum and antimony in substantially equal atomic proportions in a container the inside surface of which is made of tantalum, and incorporating into the crystal lattice of said semiconductor material a trace amount of said tantalum sufficient to provide a resistivity of at least about 10,000 ohm-centimeters in said material.

6. A method of preparing a semiconductor material that comprises reacting aluminum having a purity of at least about 99.9995 percent and antimony having a purity of at least about 99.998 percent in substantially equal atomic proportions in a container the inside surface of which consists of tantalum having a purity of at least about 99.9 percent, incorporating into the crystal lattice of said semiconductor material a trace amount of said tantalum sufficient to provide a resistivity of at least about 10,000 ohm-centimeters in said material, and directionally cooling the melt of said material.

7. A method of preparing a semiconductor material that comprises reacting aluminum and antimony in substantially equal atomic proportions in a container lined with tantalum sheet, and incorporating into the crystal lattice of said semiconductor material a trace amount of said tantalum sufficient to provide a resistivity of at least about 10,000 ohm-centimeters in said material.

8. A method of preparing a semiconductor material that comprises reacting aluminum having a purity of at least about 99.9995 percent and antimony having a purity of at least about 99.998 percent in substantially equal atomic proportions in a container lined with tantalum sheet having a purity of at least about 99.9 percent, incorporating into the crystal lattice of said semiconductor material a trace amount of said tantalum sufficient to provide a resistivity of at least about 10,000 ohm-centimeters in said material, and directionally cooling the melt of said material.

9. A method of preparing a semiconductor material that comprises reacting aluminum and antimony in substantially equal atomic proportions in a tantalum container, and incorporating into the crystal lattice of said semiconductor material a trace amount of said tantalum sufficient to provide a resistivity of at least about 10,000 ohm-centimeters in said material.

10. A method of preparing a semiconductor material that comprises reacting aluminum having a purity of at least about 99.9995 percent and antimony having a purity of at least about 99.998 percent in substantially equal atomic proportions in a tantalum container the inside surface of which has a purity of at least about 99.9 percent, incorporating into the crystal lattice of said semiconductor material a trace amount of said tantalum sufficient to provide a resistivity of at least about 10,000 ohm-centimeters in said mtaerial, and directionally cooling the melt of said material.

No references cited.

UNITED STATES PATENT OFFICE
CERTIFICATE OF CORRECTION

Patent No. 2,816,023                                   December 0, 1957

Milton Genser et al.

It is hereby certified that error appears in the printed specification of the above numbered patent requiring correction and that the sai Letters Patent should read as corrected below.

Column 3, line 8, for "exp. 165" read -- exp. 1.65 --.

Signed and sealed this 18th day of February 1958.

(SEAL)
Attest:
KARL H. AXLINE
Attesting Officer

ROBERT C. WATSON
Commissioner of Patents